Nov. 17, 1959  J. R. PROKSA  2,912,744
TOOL BIT HOLDER
Filed March 26, 1954  3 Sheets—Sheet 3
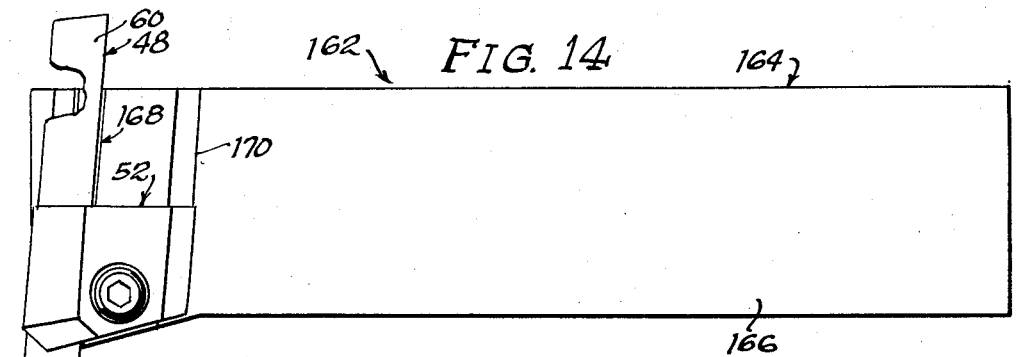
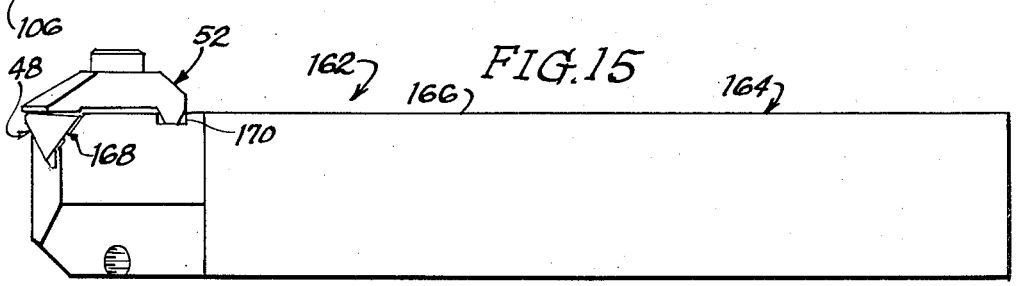
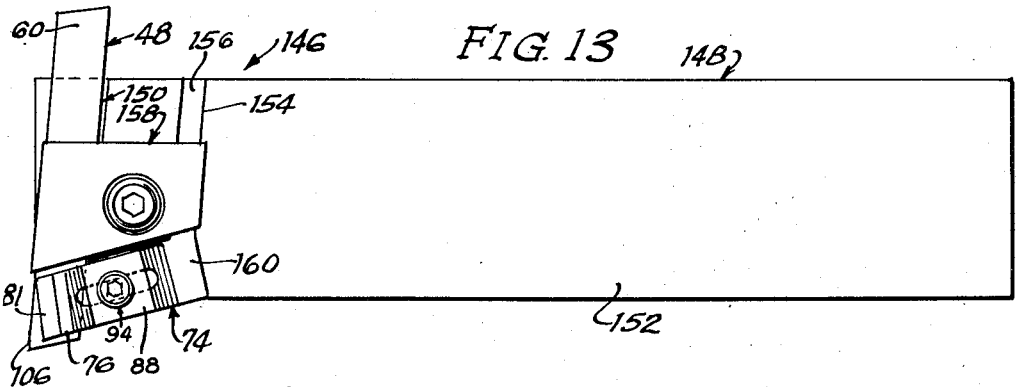
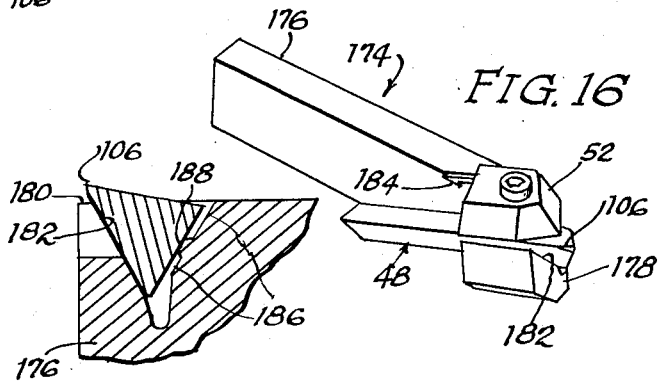
INVENTOR.
John R. Proksa
BY
Louis Sheldon
Attorney ered Nov. 17, 1959

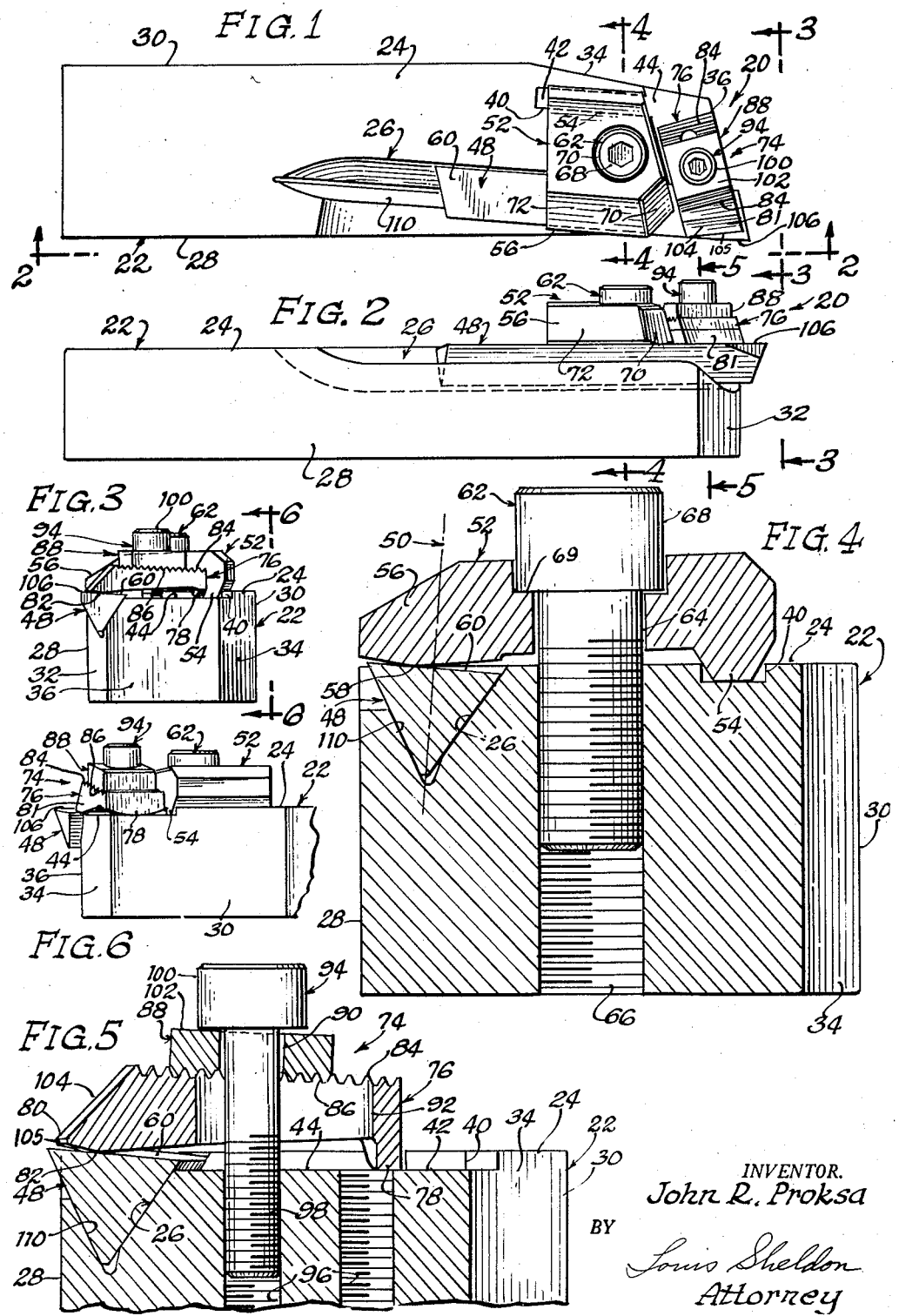

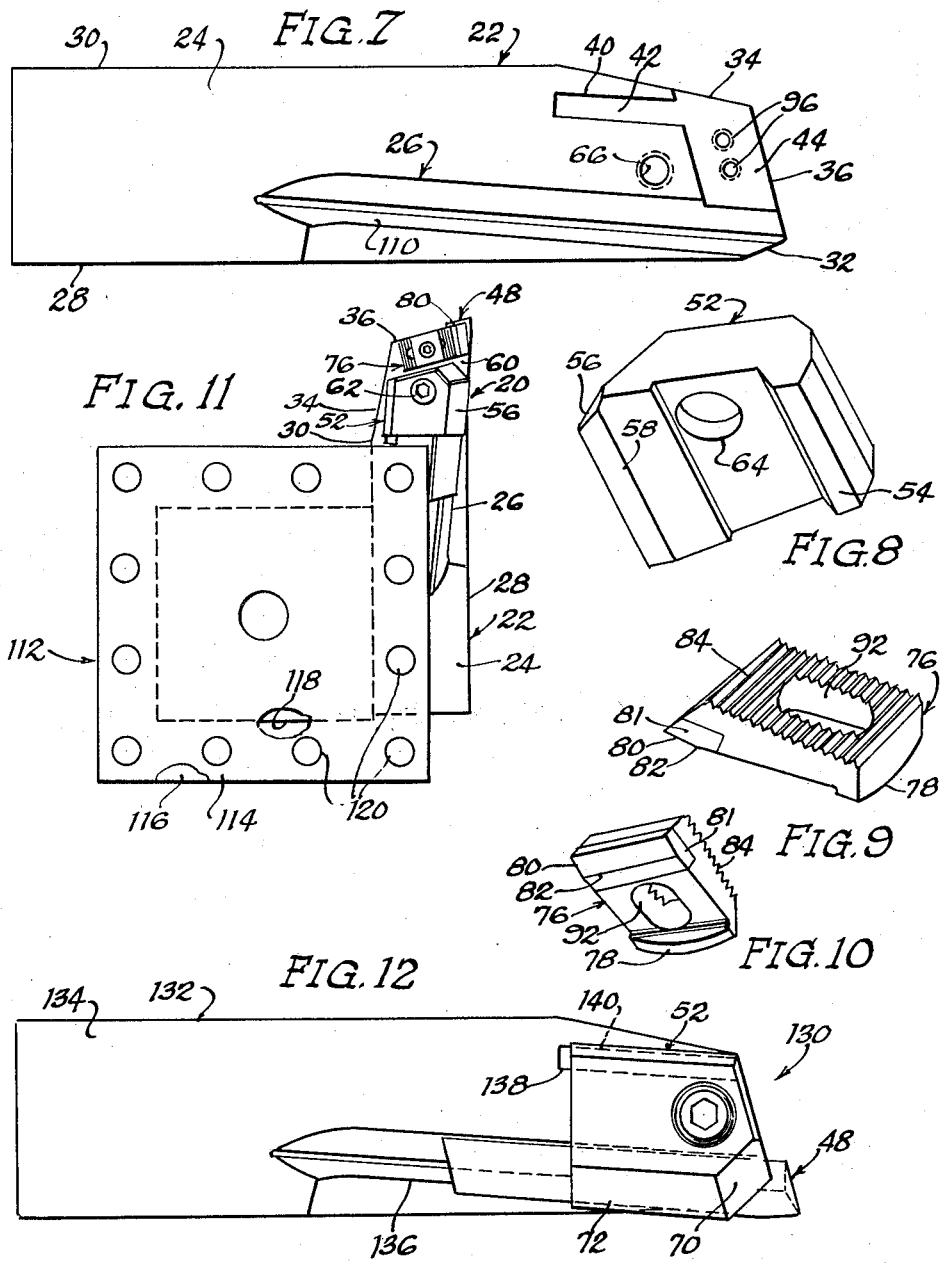

2,912,744
TOOL BIT HOLDER

John R. Proksa, Elmwood Park, Ill., assignor to Everede Tool Company, Chicago, Ill., a corporation of Illinois Application March 26, 1954, Serial No. 418,960

6 Claims. (Cl. 29—96)

This invention relates to tool bit holders.

An object of the invention is to provide a tool holder adapted to hold a solid carbide triangular tool bit and including an individual adjustable chip breaker for use in facing, turning, and boring operations on turret lathes, chucking machines, boring mills, etc., in production, and on engine lathes for tool room use.

Another object is to provide an individual chip breaker which, on the job, is adjustable to job conditions and thus the costly operation of grinding the chip breaker each time the tool is sharpened is avoided.

A further object is to provide an improved bit holder and clamp.

Further objects and advantages of the invention will appear as the description proceeds.

The invention will be better understood upon reference to the following description and accompanying drawings, in which:

Fig. 1 is a plan view of a tool holder embodying features of the invention, with a tool bit;

Figs. 2 and 3 are elevational views taken as indicated by the lines 2—2 and 3—3, respectively, in Fig. 1;

Figs. 4 and 5 are enlarged sectional views taken as indicated by the lines 4—4 and 5—5, respectively, in Fig. 2;

Fig. 6 is an elevational view taken as indicated by the lines 6—6 in Fig. 3;

Fig. 7 is similar to Fig. 1 but omits the tool bit, tool bit clamp, and chip breaker;

Fig. 8 is a bottom isometric view of the bit clamp shown in Fig. 1;

Fig. 9 is a top isometric view of the chip breaker shown in Fig. 1;

Fig. 10 is a bottom isometric view of the chip breaker shown in Fig. 1;

Fig. 11 is a plan view showing the structure of Fig. 1 mounted in the turret of a turret lathe or the like;

Fig. 12 is similar to Fig. 1 but shows a modification without a chip breaker;

Fig. 13 is a plan view of an additional modification;

Figs. 14 and 15 are, respectively, plan and front elevational views of another modification;

Fig. 16 is an isometric view of a further modification; and

Fig. 17 is an enlarged sectional view of a modified shank socket for the tool bit.

Referring now more particularly to the drawings, illustrating various forms of the invention, one form of the invention appears at 20 in Figs. 1 to 11, and comprises a steel or other suitable, preferably elongated, holder block or shank 22 whose top surface 24 is interrupted by a milled elongated V-groove or socket 26 of preferably uniform depth relative to said face throughout the major portion of its length, and extending at a slight inclination (about 5°) to the longitudinal front and back faces 28 and 30, respectively, of the shank. The shank 22 preferably converges, as indicated at 32, to avoid a knife edge, and at 34, at the working end 36 thereof, and has an upper elongated recess or keyway 40 parallel to the groove 26. The keyway bottom 42 may be continuous with a forward end surface 44 below the shank face 24.

A tool bit 48 of triangular cross-section, for example a solid tungsten carbide tool bit, is adapted to be seated in the groove 26, which is so formed that the plane (represented by the line 50) bisecting the groove is inclined downward toward the front face 28 of the shank 22 at an angle of about 5°. For retaining the bit 48 securely in the groove 26, I provide a clamping member 52 having a key 54 adapted to seat and fulcrum in the keyway 40 and also having a jaw 56 with a bit-clamping edge 58 engageable with the upper face 60 of the bit 48 in front of the plane 50. A socket head type or other suitable screw 62 passing through a hole 64 in the clamping member 52 engages in a tapped hole 66 in the shank 22, the head 68 of the screw being adapted to apply clamping pressure to the countersunk face 69 of the clamping member. The clamping member 52 is preferably relieved at 70 and 72 for chip clearance.

A chip breaker assembly 74 embodying features of the invention comprises a block 76 having a round-bottomed fulcrum portion 78 engageable with the shank surface 44 and also having a jaw 80 preferably in the form of a solid carbide tip 81 whose bottom is tapered to provide a clamping edge 82 engageable with the upper face 60 of the bit 48. The upper face of the block 76 is preferably serrated, substantially as indicated at 84, for cooperating with the like serrated bottom surface 86 of a clamping piece or washer 88, having a hole 90 adapted to overlie a slot 92 formed in the block. A socket type or other suitable screw 94 is adapted to pass through the washer hole 90 and block slot 92 and engage the desired one of preferably a pair of tapped holes 96 in the shank 22, the width of the slot being preferably substantially greater than the diameter of the screw shank 98, and the screw head 100 is engageable with the preferably flat upper face 102 of the clamping piece 88 to apply clamping pressure to the block 76. The block 76 has a tapered end face 104 serving as a chip breaker, said face being preferably inclined about 45° to the direction of movement of the tool in the cutting operation, and terminating in substantially a knife edge 105 whose sharpness will be selected according to the rate of feed, said sharpness varying inversely with the rate of feed. The bit 48 has a cutting edge 106 which may be parallel or at an angle to the shank faces 28 and 30. The chips thus impinge upon the surface 104 of the block 76 and are thereby curled and broken up in short or longer pieces or continuously coiled, depending on the adjustment. The block 76 may be adjusted rotatably and translatably by virtue of the construction of the chip breaker assembly 74 noted above, to locate the chip breaker surface 104 in the proper relation to the cutting edge 106, depending on the depth of cut and the material being cut, and the clamping edge 82, even when not parallel to the axis of the bit, will have full length line contact with the bit surface 60, this result being assured by virtue of the fact that the block 76 may be tilted, if necessary, by reason of its rounded fulcrum portion 78.

The bit-clamping edge 58 of the clamping member 52, engaging the bit 48 forwardly of the plane 50 bisecting the V-groove 26, as noted above and as shown, exerts its clamping pressure in a path which forces the bit tightly against the forward face 110 of said groove, thereby preventing chattering.

The unit 20 is adapted to be clamped in the turret 112 of a turret lathe (not shown), where the turret comprises spaced plates 114 and 116 and an intervening square hub 118. The shank 22 is adapted to be engaged with a side of the hub 118 and between marginal portions of the plates 114 and 116, one portion having marginal tapped holes 120 for the reception of clamping screws (not shown) engageable with the upper face 24 of the shank to firmly clamp the shank against the plate 116. It will be noted that the V-groove 26 is made no longer than is necessary to accommodate a bit 48 of suitable length.

Where the work is non-ferrous metal, no chip breaker is needed. There is accordingly provided, as shown in Fig. 12, a holder 130 comprising a shank 132 having in its upper face 134 a V-groove 136 and a parallel relatively shallow groove or keyway 138 whose bottom 140 is adapted to receive and fulcrum the key of a bit-clamping member 52.

Another form of the invention including a chip breaker is shown at 146 in Fig. 13, adapted for vertical and horizontal boring and facing operations. In this form the cutting edge 106 of the bit 48 may be ground at right angles or at any other suitable angle to the length of the bit holder shank 148, and a bit-seating V-groove 150 interrupts the upper face 152 of the shank and extends at almost right angles to the length of the shank. The upper face 152 of the shank 148 is also interrupted by a groove or keyway 154 whose bottom 156 seats and fulcrums the rear bottom key of a clamping member 158. The upper shank 148 is rabbeted to provide a surface 160 which may be continuous with the bottom 156 of the keyway 154 and serves as a bearing surface for the rounded bottom rear portion 78 of the block 76 of a chip breaker unit 74, which cooperates with the shank and bit 48 in the manner above described.

A further form of the invention is shown at 162 in Figs. 14 and 15, and is similar to that shown in Fig. 13 and is a right hand tool adapted for similar operations but without a chip breaker. The holder 162 comprises a shank 164 whose upper face 166 is interrupted by a bit-seating V-groove 168 and a parallel groove or keyway 170 for seating the key of a bit-clamping member 52.

A modified holder 174, shown in Figs. 16 and 17, is adapted for use in turning and facing operations for engine lathes, and comprises a shank 176 having an offset head 178 whose upper face 180 is interrupted by a bit-seating V-groove 182, the shank having a parallel groove or keyway 184 for seating and fulcruming the key of a clamping member 52. The back face of the groove 182 may be relieved as at 186 to provide an intervening and relatively narrow bit-supporting surface 188.

In compliance with the requirements of the patent statutes I have here shown and described a few preferred embodiments of my invention. It is, however, to be understood that the invention is not limited to the precise construction here shown, the same being merely illustrative of the principles of the invention. What I consider new and desire to secure by Letters Patent is:

1. A bit holder comprising a shank having in the top thereof an inclined V-groove for seating a tool bit of triangular cross-section, said groove having an open end from which the working end of the bit is adapted to project beyond the front and the adjacent end of the shank, said shank also having in the top thereof and adjacent but spaced from the rear and said end thereof a keyway parallel to said V-groove, a pressure block having a key at the rear thereof fulcrumed in said keyway and also having a forward clamping portion parallel to the fulcrum axis, said clamping portion being formed to have substantially only line contact with the top face of the seated bit, said contact being forward of the bisector of said V-groove, a screw passing through said block and threaded in said shank and having a shoulder engaging said block only forward of the screw axis, said block being slightly spaced from said shank end, a chip breaker block overlying said shank end beyond and adjacent said pressure block, said chip breaker piece having a rear depending round-bottomed boss resting on said shank end and also having a forward clamping portion having only line contact with the top face of the seated bit along a line inclined from the front to the rear of said bit face, said piece being transversely rockable on said shank by virtue of the round-bottomed boss to assure full line clamping engagement of the last-mentioned clamping portion with the seated bit, said piece being serrated at the top thereof and having a slot therethrough, said slot being elongated from front to rear transverse to the serrations, a washer over said piece and having bottom serrations meshed with the aforesaid serrations, and a screw passing down through said washer and through said slot and threaded into said shank, the head of said screw being engaged with said washer only forward of the screw axis to clamp said piece against the seated bit, said serrations locking the washer and piece against movement from any desired adjustment when the screw is tight, the upper side of the forward end of said piece being tapered downward and forward to substantially a knife edge disposed forward of the clamping line of said piece.

2. A bit holder comprising a shank having parallel front and rear sides and having in the top thereof a V-groove for seating a bit of triangular cross-section, said groove extending at a slight angle to said sides and disposed entirely adjacent the front and remote from the rear of said shank, said groove being open at the working end of said shank and substantially intersecting the front side of said shank, the plane bisecting the angle of said groove diverging upward away from the front of the shank, said shank having a substantially L-shaped upper surface slightly below the top thereof, one branch of said lower surface extending parallel to said groove and forming the bottom of a recess, the other branch of said lower surface extending to said end and the rear side of said groove at the open end thereof, a pressure block having a key seated in the first branch and having a bit-clamping edge parallel to said key and disposed entirely forward of said plane, means for pressing said block so as to clamp said edge against the upper face of the seated bit, a chip breaker member having a depending rear portion engaged with said other branch and a forward clamping edge engageable throughout its length with the upper face of the bit irrespective of the angle between said edge and the bit corners bordering the upper face of the bit, and means for forcing said edge into clamping engagement with the bit, said chip breaker member having an upper chip breaker surface at the forward end thereof, said upper chip breaker surface tapering downward and forward and terminating adjacent the open end of said groove.

3. A holder for a triangular tool bit, said holder comprising a shank having a bit-seating V-groove in a face thereof, a member disposed over said face and having a tapered chip-breaker surface at the upper forward end thereof, said member also having a bit-engaging edge below said surface, said member being universally adjustable on said shank to locate said edge in and out of parallelism with the bottom of said groove and in full length engagement with the bit notwithstanding non-parallelism between said edge and said groove bottom, and means for clamping said edge against the bit.

4. A holder for a triangular tool bit, said holder comprising a shank having at the forward upper portion thereof a bit-seating V-groove open upward and at an end of said shank, a plate-like member over said shank and having an upwardly facing tapered forward end chip-breaker surface adapted to overlie the forward open end portion of said groove, the upper face of said member, rearwardly of said tapered surface, having serrations extending substantially parallel to the forward end of said member, said member having a slot therethrough transverse to and interrupting certain of said serrations, said member having rearwardly of said slot a depending bearing lug engaging the upper portion of said shank and extending transverse to the longitudinal axis of said slot and gradually convexly rounded at the bottom thereof about an axis substantially parallel to the slot axis, said lug terminating substantially at the sides of said member, a clamping element over said member and having a hole therethrough in register with said slot, said element having serrations engaging the serrations of said member, and a screw passing freely through said hole and slot and threaded in said shank, the head of said screw being engageable with said element to clamp said member in various adjustments relative to said shank.

5. In a chip breaker, a member having a tapered upwardly facing front end chip-breaker surface, said member having a bottom tool-bit-clamping edge below said surface and having at its rear end a depending lug extending generally parallel to said front end, the bottom of said lug being rounded about a fore-and-aft axis and being rockable on a flat support to vary the angle of said front end and clamping edge relative to the support.

6. In a chip breaker, a member having a tapered upwardly facing front end chip-breaker surface, said member having at its rear end a depending lug extending generally parallel to said front end, the bottom of said lug being rounded about an axis transverse to said ends and being engageable with a flat support to vary the angle of said front end relative to the support, said member having a slot therethrough beyond said tapered surface and elongated in a direction transverse to said ends, the upper face of said member beyond said tapered surface being serrated.

References Cited in the file of this patent

UNITED STATES PATENTS

| | | |
|---|---|---|
| 1,397,357 | Bronander | Nov. 15, 1921 |
| 1,405,714 | Miller et al. | Feb. 7, 1922 |
| 1,776,335 | Rauzieres | Sept. 23, 1930 |
| 1,854,672 | Robinson | Apr. 19, 1932 |
| 2,181,023 | Moore | Nov. 21, 1939 |
| 2,310,992 | Proksa | Feb. 16, 1943 |
| 2,365,079 | Huber | Dec. 12, 1944 |
| 2,400,708 | Parker | May 21, 1946 |
| 2,449,823 | Sheridan | Sept. 21, 1948 |
| 2,450,365 | Thompson | Sept. 28, 1948 |
| 2,737,705 | Nookov | Mar. 13, 1956 |

FOREIGN PATENTS

| | | |
|---|---|---|
| 453,173 | Great Britain | Sept. 7, 1936 |
| 880,991 | France | Jan. 15, 1943 |
| 1,025,299 | France | Apr. 13, 1953 |
| 1,041,370 | France | Oct. 22, 1953 |